(12) United States Patent
Balk et al.

(10) Patent No.: US 9,664,112 B2
(45) Date of Patent: May 30, 2017

(54) DEVICE FOR SUSPENDING A TURBOJET ENGINE

(75) Inventors: Wouter Balk, Melun (FR); Thomas Alain Christian Vincent, Palaiseau (FR)

(73) Assignee: SNECMA, Paris (FR)

( * ) Notice: Subject to any disclaimer, the term of this patent is extended or adjusted under 35 U.S.C. 154(b) by 829 days.

(21) Appl. No.: 13/976,243

(22) PCT Filed: Dec. 20, 2011

(86) PCT No.: PCT/FR2011/053066
§ 371 (c)(1),
(2), (4) Date: Aug. 29, 2013

(87) PCT Pub. No.: WO2012/089956
PCT Pub. Date: Jul. 5, 2012

(65) Prior Publication Data
US 2013/0327058 A1 Dec. 12, 2013

(30) Foreign Application Priority Data
Dec. 27, 2010 (FR) ..................... 10 61281

(51) Int. Cl.
*F02C 7/20* (2006.01)
*B64D 27/18* (2006.01)
*B64D 27/26* (2006.01)

(52) U.S. Cl.
CPC ................ *F02C 7/20* (2013.01); *B64D 27/18* (2013.01); *B64D 2027/268* (2013.01); *Y02T 50/44* (2013.01)

(58) Field of Classification Search
CPC ........... F02C 7/20; B64D 27/00; B64D 27/10; B64D 27/12; B64D 27/14; B64D 27/16;
(Continued)

(56) References Cited

U.S. PATENT DOCUMENTS 3,844,115 A * 10/1974 Freid ..................... B64D 27/18
244/54
4,065,077 A * 12/1977 Brooks .................. B64D 27/26
244/54
(Continued)

FOREIGN PATENT DOCUMENTS

| CN | 1570365 A | 1/2005 |
|---|---|---|
| CN | 101484357 A | 7/2009 |

(Continued)

OTHER PUBLICATIONS

International Search Report Issued Apr. 24, 2012 in PCT/FR11/053066 Filed Dec. 20, 2011.
(Continued)

*Primary Examiner* — Steven Sutherland
(74) *Attorney, Agent, or Firm* — Oblon, McClelland, Maier & Neustadt, L.L.P.

(57) ABSTRACT

A turbojet is suspended by attachments including hinged links. An attachment includes a support including three branches with passages through which a pin passes, the pin being oriented generally parallel to a direction that is tangential to a casing and being hinged to a central branch of the support by a ball joint.

6 Claims, 1 Drawing Sheet

(58) Field of Classification Search
CPC .. B64D 27/18; B64D 27/20; B64D 2027/262;
B64D 2027/266; B64D 2027/268
USPC .............................. 60/796, 797, 798; 244/54
See application file for complete search history.

(56) References Cited

U.S. PATENT DOCUMENTS

| | | | | |
|---|---|---|---|---|
| 5,927,644 | A * | 7/1999 | Ellis ..................... | B64D 27/26 |
| | | | | 244/54 |
| 6,682,015 | B2 * | 1/2004 | Levert ................... | B64D 27/26 |
| | | | | 244/54 |
| 7,093,996 | B2 * | 8/2006 | Wallace ................ | B64D 27/26 |
| | | | | 403/78 |
| 2006/0280551 | A1 | 12/2006 | Pineiros et al. | |
| 2011/0110705 | A1 | 5/2011 | Soulier et al. | |
| 2012/0080555 | A1 * | 4/2012 | Lafont ................... | B64D 27/26 |
| | | | | 244/54 |

FOREIGN PATENT DOCUMENTS

| | | |
|---|---|---|
| CN | 101784441 A | 7/2010 |
| CN | 101784442 A | 7/2010 |
| CN | 101484357 B | 9/2011 |
| CN | 101784441 B | 8/2013 |
| CN | 101784442 B | 10/2013 |
| FR | 2 920 178 | 2/2009 |
| FR | 2 925 016 | 6/2009 |

OTHER PUBLICATIONS

Combined Chinese Office Action and Search Report issued Dec. 31, 2014 in Patent Application No. 201180061475.6 (with English language translation of Office Action and English translation of categories of cited documents).

* cited by examiner

DEVICE FOR SUSPENDING A TURBOJET ENGINE

BACKGROUND OF THE INVENTION

Field of the Invention

The invention relates to a device for suspending a turbojet, in particular under a wing, and it relates more particularly to an improvement of an attachment between the turbojet and the pylon connected to the structure of the airplane. A so-called "middle" attachment of this kind is intended more particularly to take up thrust. By way of example, such an attachment is arranged between a front attachment connected to the casing of the fan and a rear attachment connected to the outer shroud of the exhaust casing.

Description of the Related Art

In a bypass turbojet as described for example in FR 2 925 016, the incoming air is compressed by the fan rotor and then split into two streams referred to as a core stream and as a bypass stream, that are cylindrical and coaxial. The bypass stream flows around the engine proper and is ejected downstream in order to provide a large fraction of the thrust. The core stream is subjected to compression before reaching the combustion chamber where it is mixed with fuel. The mixture is burnt in order to produce hot gases that feed successive turbine stages that drive the compressors and the fan. The core stream is also ejected into the center of the cold air flow in order to provide some of the thrust. The ratio of the flow rates of the bypass stream and of the core stream is referred to as the bypass ratio. The ratio of the diameters of the fan casing and of the engine casing is an important parameter for obtaining a high bypass ratio.

Such a turbojet is fastened by means of a support structure known as a pylon, e.g. under a wing.

When it is desired to increase the bypass ratio, it is necessary to define a turbojet in which the fan occupies a very large amount of space. In order to be able to install such a turbojet of very large diameter, it is necessary to approach the axis of the turbojet to the structure that carries it (typically a wing). Consequently, the space available for the pylon and for fastening attachments thereto is small.

The above-mentioned prior document describes in particular an isostatic middle attachment that is said to provide "total protection" that is suitable for preventing the turbojet becoming separated from its pylon. That middle attachment comprises in particular two links that are arranged symmetrically on either side of a vertical midplane between the hub of the front casing and the rear attachment or directly to the pylon, in the vicinity of the rear attachment.

Those two links are mounted via hinge connections to a yoke that is itself hinged to a base that is fastened to the rear attachment or to the pylon.

The yoke presents a transverse width such that it can also have hinge connections with clearance at the ends with lateral extensions of the base. In the event of a link breaking, the clearance existing between one of the extensions and the yoke is consumed. The forces are redistributed and then pass via the remaining link. If the break takes place in the central connection between the yoke and the base, both of the extensions take up the forces. That is why the attachment is said to provide "total protection", since the breakage of any one element leads to a new distribution of force paths, preventing total breakage of the attachment.

Nevertheless, in order to accommodate an increase in the diameter of the fan, it is desirable to reduce the size of such an attachment under the pylon. Furthermore, in the known system as described in FR 2 925 016, it is also necessary to provide empty space between the pylon and the turbojet in order to be able to dismantle the attachment, since the attachment is oriented generally radially relative to the engine axis. In addition, that known attachment is relatively complex and expensive.

BRIEF SUMMARY OF THE INVENTION

The invention seeks to remedy all of those problems.

More particularly, the invention provides firstly a device for suspending an airplane turbojet, wherein said turbojet is connected to a pylon fastened to the structure of the airplane by hinged link attachments, each connecting said pylon to a casing of said turbojet, the device being characterized in that a said attachment comprises a support for a pin fastened to said pylon and made up of three spaced-apart branches having passages through which said pin passes, said pin support being fastened to said pylon in such a manner that said pin is oriented generally parallel to a direction that is tangential to said casing, in that said pin is hinge-mounted by a ball joint to the central branch of said support, in that it passes through the other two branches with clearance, and in that the two above-mentioned links are arranged symmetrically about a midplane of said support and are hinged-connected to said casing and to said pin.

Thus, the fact that the hinge axis of the total protection attachment is now oriented substantially tangentially relative to the casing makes it possible to move the attachment closer to the pylon, other things remaining equal, without disturbing the ease of separation, since the pin can be dismantled laterally.

Furthermore, and as explained below, the pin support can be simplified and its cost can be reduced by adopting a simple modular structure, said support being made up of side-by-side assembly of three parts that are identical or substantially identical, thereby embodying the three above-mentioned branches.

Advantageously, each link is connected directly to said pin. It may be connected directly to said pin by a ball joint.

In a possible embodiment, said ball joint providing a hinge connection of said link to said pin is situated in the vicinity of a corresponding end of the pin and on the side of one of said two other branches that is remote from said central branch of said support.

Thus, said other two branches, which do not normally interact with elements of the attachment, given that predetermined clearance is defined between their bores and the pin of the yoke, make it possible to obtain the redundancy needed for taking up forces in the event of an element of the attachment breaking.

Furthermore, the maximum cross-section is smaller than in the prior art solution. Finally, the width of the attachment is reduced, whereby, for the middle attachment, drag is reduced in the stream of cold air from the fan. The fairings surrounding the attachment in the stream are also of reduced size. This serves to increase the section of the bypass stream and consequently to increase efficiency. Finally, the weight of the attachment system is reduced.

The principle of the invention applies in particular to the middle attachment, but it can be transposed to the other attachments, at the front and/or at the rear.

BRIEF DESCRIPTION OF SEVERAL VIEWS OF THE DRAWINGS

The invention can be better understood and other advantages thereof appear better in the light of the following description of an embodiment in accordance with the principle of the invention, given purely by way of example and made with reference to the accompanying drawings, in which.

DETAILED DESCRIPTION OF THE INVENTION

Figure 1:
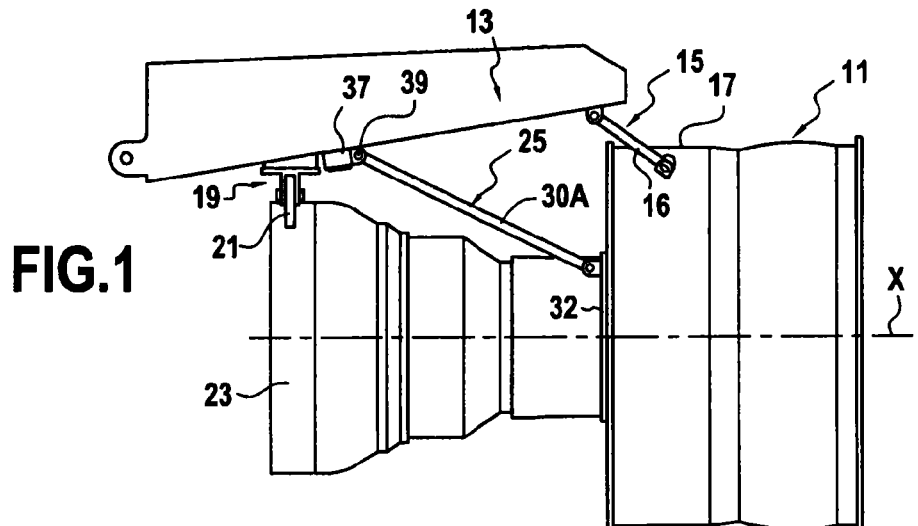
FIG. 1 is a diagrammatic elevation view of a turbojet connected to a pylon secured to an airplane, e.g. mounted under a wing.

FIG. 1 shows a turbojet 11 attached to a pylon 13, itself fastened to an airplane (not shown), under a wing, in this example. The turbojet is attached to the pylon via three attachments. A front attachment 15 comprises two spaced-apart links 16 that are divergent and hinged at their ends. They are connected between the front of the pylon 13 and the outer shroud 17 of the fan casing. A rear attachment 19 also comprises two hinged links 21 between the pylon 13 and the exhaust casing 23. A middle attachment 25 extends between the front and rear attachments. The middle attachment 15 comprises two links 30A and 30B that are connected between the pylon 13 and a casing of the turbojet, and more particularly in this example the hub 32 of an intermediate casing arranged inside the fan shroud and supporting the front central portion of the turbojet. The invention is more particularly described herein with reference to the structure of the middle attachment.

This middle attachment 25 is for taking up thrust forces. The links 30A and 30B are stressed in traction when the turbojet is operating normally, and in compression in the event of said turbojet being operated with thrust reversal.

In accordance with the invention, each so-called "middle" attachment 25 comprises a pin support 37 fastened to the pylon 13 and having a yoke pin 39 hinged thereto. The support has three spaced-apart branches 40, 41, 42 having aligned passages 46 through which said pin 39 passes. Said pin support 37 is fastened to said pylon so that the pin 39 is oriented generally parallel to a direction that is tangential to said casing and perpendicular to the engine axis X. Furthermore, this pin 39 is hinge-mounted by a ball joint 47 to the central branch 40 of the support 37. It passes through the other two branches 41 and 42 with clearance. The two above-mentioned links 30A and 30B are arranged symmetrically about a midplane P of the support (passing through the central branch) and connected via hinges at their respective ends to said casing (the hub 32) and to said pin 39.

Figure 3:
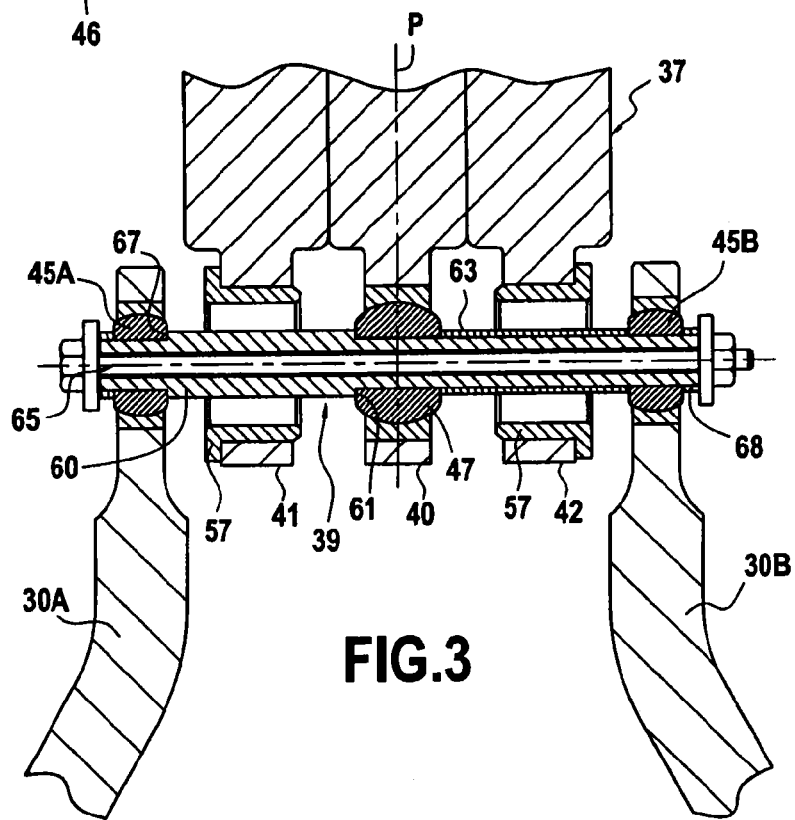
FIG. 3 is a detail view of the attachment, beside the pylon.

In the example shown in FIG. 3, each link 30A, 30B is connected directly via a ball joint 45A, 45B to a respective end of the pin 39, i.e. at a point outside the passages defined through the two branches 41 and 42. It would also be possible to hinge the two links to an intermediate part forming a fork engaged on either side of the central branch of the support, in order to obtain an attachment that is generally narrower in the bypass air stream.

Figure 2:
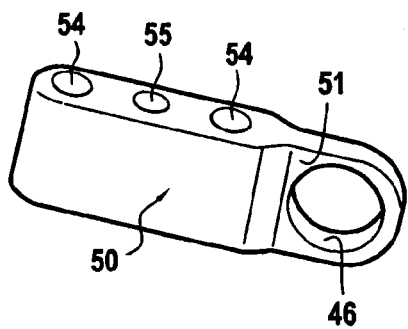
FIG. 2 is a detail view in perspective of an element constituting the attachment support that is to be fastened to the pylon.

As shown, the support 37 is defined using three parts 50 that are exactly identical in this example, these parts (see FIG. 2) being arranged side by side, with each of them defining one of the above-mentioned branches, via a narrower portion 51 thereof. The three side-by-side parts are fastened to the pylon 13 in such a manner that the pin 39 extends substantially horizontally and transversely relative to the axis X of the engine, and thus parallel to a direction that is tangential to the turbojet. For fastening to the pylon, each part has two holes 54 for passing bolts and one hole 55 for positioning by means of a peg that is secured to the pylon. The three parts 50 are bolted side by side to the pylon so that said three branches are oriented substantially radially towards the turbojet.

The three parts 50 may also be bolted together transversely to these holes.

According to a remarkable feature, the two passages 46 in the two branches 41, 42 situated on either side of the central branch 40 are bores that receive bushings 57. These bushings are of selected thickness and they are mounted in the bores so that they determine a desired amount of clearance between the pin 39 and each of the branches 41 and 42. The clearance can thus be adjusted by adapting the bushings. The thicker the bushings, the smaller the resulting clearance.

Each ball joint 45A, 45B is held stationary in the vicinity of a corresponding end of the pin 39 and on the side of a corresponding one of said other two branches 41 and 42 that is remote from said central branch 40 of said support 37.

With reference more particularly to FIG. 3, it can be seen that the pin 39 is advantageously constituted by a tube 60 having two segments of different diameters that define a shoulder 61 in the central portion. The shoulder 61 forms a first abutment for positioning the ball joint 47 of the central branch whereby the pin 39 is hinged relative to the support 37. The smaller-diameter segment is covered in a sleeve 63 forming a second abutment for positioning said ball joint of the central branch. The tube 60, said ball joint 47, and said sleeve 63, in particular, are held assembled together by axial bolting 65 running along said tube 60.

The end of the larger-diameter portion of the tube also has a shoulder 67 for positioning the ball joint 45A associated with one of the links. At the other end, the ball joint 45B of the other link is positioned to bear against the end of the sleeve on one side and against a ring 68 on the other. All of this assembly is stabilized by the axial bolting 60.

As mentioned above, the invention can be transposed to attachments other than said middle attachment.

The invention claimed is:

1. A device for suspending an airplane turbojet, wherein the airplane turbojet is connected to a pylon fastened to a structure of an airplane by attachments including hinged links, each attachment connecting the pylon to a casing of the airplane turbojet,
wherein at least one of the attachments comprises a pin support for a pin fastened to the pylon, and including first, second, and third spaced-apart branches including passages through which the pin passes,
the first, second, and third branches are arranged side-by-side and are fastened to the pylon such that the pin is oriented parallel to a direction that is tangential to the casing,
wherein the pin is hinge-mounted by a ball joint to the first branch of the pin support, the first branch being a central branch,
wherein the pin passes through the second and third branches with clearance,
wherein two of the hinged links are arranged symmetrically about a midplane of the pin support and are hinged-connected to the casing and to the pin, and
wherein the pin support is defined using three identical parts arranged side by side, each part including a first portion and a second portion, the second portion of each of the parts defining one of the first, second, and third branches.

2. A device according to claim 1, wherein said two of the hinged links are connected directly to the pin by a ball joint.

3. A device according to claim 2, wherein each ball joint providing a hinge connection for each of said two of the hinged links to the pin is situated in a vicinity of a corresponding end of the pin and on a side of one of the second and third branches that is remote from the first branch of the pin support.

4. A device according to claim 1, wherein two passages in the second and third branches situated on either side of the first branch are bores, and bushings of selected thickness are mounted in the bores to determine a desired clearance between the pin and each of the second and third branches.

5. A device according to claim 1, wherein the pin comprises a tube including two segments of different diameters defining a shoulder in a central portion, wherein the shoulder forms a first abutment for positioning the ball joint of the first branch, wherein a smaller-diameter segment is covered by a sleeve forming a second abutment for positioning the ball joint of the first branch, with the tube, the ball joint, and the sleeve, being held assembled together by axial bolting passing through the tube.

6. A device for suspending an airplane turbojet, wherein the airplane turbojet is connected to a pylon fastened to a structure of an airplane by attachments including hinged links, each attachment connecting the pylon to a casing of the airplane turbojet, wherein at least one of the attachments comprises a pin support for a pin fastened to the pylon, and including first, second, and third spaced-apart branches including passages through which the pin passes, the pin support being fastened to the pylon such that the pin is oriented parallel to a direction that is tangential to the casing, wherein the pin is hinge-mounted by a ball joint to the first branch of the pin support, the first branch being a central branch, wherein the pin passes through the second and third branches with clearance, and wherein two of the hinged links are arranged symmetrically about a midplane of the pin support and are hinged-connected to the casing and to the pin, and wherein the pin comprises a tube including two segments of different diameters defining a shoulder in a central portion, wherein the shoulder forms a first abutment for positioning the ball joint of the first branch, wherein a smaller-diameter segment is covered by a sleeve forming a second abutment for positioning the ball joint of the first branch, with the tube, the ball joint, and the sleeve, being held assembled together by axial bolting passing through the tube.

* * * * *